(12) United States Patent
Marquier

(10) Patent No.: US 11,487,305 B2
(45) Date of Patent: Nov. 1, 2022

(54) THERMOSTATIC CARTRIDGE

(71) Applicant: VERNET, Ollainville (FR)

(72) Inventor: Samuel Marquier, Fleury Merogis (FR)

(73) Assignee: VERNET, Ollainville (FR)

( * ) Notice: Subject to any disclaimer, the term of this patent is extended or adjusted under 35 U.S.C. 154(b) by 171 days.

(21) Appl. No.: 17/059,153

(22) PCT Filed: May 27, 2019

(86) PCT No.: PCT/EP2019/063637
§ 371 (c)(1),
(2) Date: Nov. 25, 2020

(87) PCT Pub. No.: WO2019/228973
PCT Pub. Date: Dec. 5, 2019

(65) Prior Publication Data
US 2021/0223804 A1 Jul. 22, 2021

(30) Foreign Application Priority Data
May 28, 2018 (FR) ...................... 1854517

(51) Int. Cl.
G05D 23/13 (2006.01)
F16K 37/00 (2006.01)

(52) U.S. Cl.
CPC ..... *G05D 23/1353* (2013.01); *F16K 37/0083* (2013.01)

(58) Field of Classification Search
CPC .. G05D 23/13; G05D 23/1306; G05D 23/132; G05D 23/134; G05D 23/1346; G05D 23/1353
See application file for complete search history.

(56) References Cited

U.S. PATENT DOCUMENTS 7,673,808 B2   3/2010   Mace et al.
2008/0035744 A1  2/2008   Mace et al.

FOREIGN PATENT DOCUMENTS

FR    92 539 E      11/1968
GB    2266132 A  * 10/1993  ......... G05D 23/1353
(Continued)

OTHER PUBLICATIONS

Search Report for International Application No. PCT/EP2019/063637 dated Jul. 30, 2019.
(Continued)

*Primary Examiner* — Jonathan Bradford
(74) *Attorney, Agent, or Firm* — Pearne & Gordon LLP

(57) ABSTRACT

The thermostatic cartridge includes: a cartridge body, inside which are delimited a chamber, a hot and cold fluid inlet passages and a mixed fluid outlet passage; a slide valve regulating the temperature of the mixed fluid, movable along an axis to close, in inverse proportions, the inlet passages; a thermostatic element, a mechanism for adjusting a thermostatic regulation temperature, which is, in a usage configuration, mechanically connected to the body to set, and by actuation, to modify the position of the piston of the thermostatic element along the axis; and a control member rotationally mounted on the body so as to, in the usage configuration, actuate it when the control member is rotationally driven in between positions associated with extreme low and high values of the thermostatic regulation temperature. When the control member is driven past a first position, the adjustment mechanism is disconnected from the body or control member.

14 Claims, 10 Drawing Sheets

(56) References Cited

FOREIGN PATENT DOCUMENTS

| WO | 01/95046 A1 | 12/2001 |
| WO | 2005/103853 A1 | 11/2005 |
| WO | 2005/124495 A1 | 12/2005 |
| WO | 2015/086749 A1 | 6/2015 |

OTHER PUBLICATIONS

Search Report for French Application No. 18 54517 dated Jan. 24, 2019.

* cited by examiner

THERMOSTATIC CARTRIDGE

CROSS-REFERENCE TO RELATED APPLICATIONS

This is the National Stage of PCT international application PCT/EP2019/06363, filed on May 27, 2019, which claims the priority of French Patent Application No. 1854517, filed May 28, 2018, both of which are incorporated herein by reference in their entirety.

The present invention relates to a thermostatic cartridge.

In this type of cartridge, the thermostatic regulation is generally obtained using a thermostatic element on the one hand comprising a piston that is normally stationary relative to a cartridge body, and on the other hand a heat-sensitive body, which is secured to a regulating slide valve and which contains, for example, a thermodilatable material whose expansion drives the deployment of the piston relative to the heat-sensitive body. This slide valve is movable relative to the cartridge body so as to cause an inverse variation of the flow sections of two fluids, called "hot fluid" and "cold fluid", entering inside the cartridge body so as to mix these fluids in variable proportions to obtain an outgoing fluid, called "mixed fluid". By modifying the position of the piston relative to the casing, using an appropriate adjustment mechanism, the thermostatic regulation temperature is set, i.e., the equilibrium temperature around which the temperature of the mixed fluid is controlled. In order to adjust the thermostatic regulation temperature, the adjustment mechanism is actuated to move by a control member, such as a rod, which can be driven in rotation on itself from outside the cartridge body and which, inside the cartridge body, is mechanically connected to the adjustment mechanism: each angular position of this control member has an associated value of the thermostatic regulation temperature, with the understanding that the angular travel of the rod is limited between the first and second angular positions, which respectively correspond to an extreme low value and an extreme high value of the thermostatic regulation temperature. FR-E-92 539 and WO-A1-2005/103853 disclose examples of such cartridges.

In practice, the thermostatic cartridge in the assembled state is intended to be attached in a tap body where the thermostatic cartridge will be supplied with hot fluid and with cold fluid. The cartridge body must be fixedly mounted in the tap body, by an ad hoc mounting member. When this mounting member is a ring to be driven in rotation on itself in order to clamp the cartridge body against the tap body, there is a risk that the driving of this ring in rotation will cause the control member to be driven in rotation. For certain tap designs, simultaneously driving such a mounting ring and the control member in rotation can even be desirable in order to simplify the design of the cartridge and/or to facilitate its installation in the tap body. However, the control member is not designed to be driven outside its aforementioned limited angular travel: indeed, beyond the two angular positions between which this travel is limited, there are risks of damaging or blocking the cartridge, in particular its adjustment mechanism and its thermostatic element.

The aim of the present invention is to propose an improved thermostatic cartridge, which can in particular offer greater ease of mounting in a tap.

To that end, the invention relates to a thermostatic cartridge, including:
- a cartridge body, inside which are simultaneously delimited a chamber in which a hot fluid and a cold fluid mix in order to form a mixed fluid, a hot fluid inlet passage through which the hot fluid penetrates the chamber from the outside of the cartridge body, a cold fluid inlet passage through which the cold fluid penetrates the chamber from the outside of the cartridge body, and a mixed fluid outlet passage through which the mixed fluid contained in the chamber leaves the cartridge body,
- a slide valve for regulating the temperature of the mixed fluid, which is arranged inside the chamber and which is movable along an axis relative to the cartridge body so as to close, in respective inverse proportions, the hot fluid inlet passage and the cold fluid inlet passage,
- a thermostatic element which includes a heat-sensitive body, which is secured to the slide valve and is arranged to be in contact with the mixed fluid, and a piston, the heat-sensitive body and the piston moving relative to one another along the axis as a function of the temperature of the mixed fluid,
- an adjustment mechanism for adjusting a thermostatic regulation temperature, which adjustment mechanism is, in a usage configuration, mechanically connected to the cartridge body and is designed to secure the position of the piston along the axis relative to the cartridge body and to alter this position of the piston by actuating the adjustment mechanism to move relative to the cartridge body, and
- a control member, which is mounted on the cartridge body so as to rotate about the axis, while being rotationally drivable from the outside of the cartridge body, and which is mechanically connected to the adjustment mechanism in the usage configuration so as to actuate the adjustment mechanism to move when the control member is driven in rotation between first and second angular positions, which are respectively associated with an extreme low value and an extreme high value of the thermostatic regulation temperature, wherein the adjustment mechanism is designed, when the control member is driven in rotation about the axis past the first angular position, to go between the usage configuration and a disengaged configuration in which the connection between the adjustment mechanism and either the cartridge body or the control member is interrupted.

The idea at the base of the invention is to allow the adjustment mechanism belonging to the thermostatic cartridge to be disengageable, with respect either to the control member, or to the cartridge body, when the control member is driven in rotation past its angular position associated with the extreme low value of the thermostatic regulation temperature. Thus, when the control member is driven in rotation past this first angular position, and if applicable over several revolutions, the adjustment mechanism can go from its usage configuration to a disengaged configuration that prevents it from being damaged or locked, as well as preventing the thermostatic element from being damaged, without increasing the axial space requirement of the adjustment mechanism. Such a possibility of driving the control member can also prevent damage to the cartridge connected to the untimely passing of the aforementioned first angular position or related to the application by the user of an excessive stop torque to command the cartridge to fully cold. Such a possibility of driving the control member can also be used to facilitate the mounting of the cartridge according to the invention in a tap body, in particular when a mounting ring is to be screwed in order to clamp the cartridge body against the tap body, while providing that the driving of this mounting ring for clamping thereof is done simultaneously with the driving of the control member past its first angular position. The passage from the disengaged configuration to the usage configuration is also done by driving the control member in rotation past the first angular position, but in the direction opposite the driving of the control member in order to take the adjustment mechanism from the usage configuration to the disengaged configuration. Of course, this driving of the control member to take the adjustment mechanism from its disengaged configuration to its usage configuration is done without simultaneous driving of the aforementioned mounting ring, so that the latter maintains the clamping of the cartridge body in the tap body. Advantageously, as described in detail hereinafter, the adjustment mechanism is further designed to return to a prior calibration of the thermostatic cartridge regarding its thermostatic regulation temperature.

According to additional features of the thermostatic cartridge according to the invention:

The control member and the adjustment mechanism are connected in rotation about the axis relative to one another and are translatable along the axis relative to one another, and the adjustment mechanism and the cartridge body are connected to one another by a helical connection centered on the axis when the adjustment mechanism is in the usage configuration and their connection is interrupted when the adjustment mechanism is in the disengaged configuration.

The control member is made in the form of a tubular casing, which is centered on the axis and which includes:

a first annular end part, which mechanically cooperates with the adjustment mechanism according to a slide connection, a second annular end part, which is axially opposite the first annular end part and which extends axially to the outside of the cartridge body, and a running part, which couples the first and second annular end parts.

The adjustment mechanism includes:

a nut, which is connected in rotation about the axis to the control member, while being translatable along the axis relative to the control member, and which is provided with a thread which, in the usage configuration, is screwed to a thread of the cartridge body while forming the helical connection, whereas, in the disengaged configuration, the thread of the nut is disengaged from the thread of the cartridge body, an endpiece, which is mounted on the nut so as to slide along the axis, and a resilient compression member, which is axially interposed between the nut and the endpiece and which is designed, when the adjustment mechanism is in the usage configuration, both to keep the endpiece axially pressed against the piston so as to adjust the position of the piston along the axis relative to the cartridge body and to compress axially so as to resiliently take up a deployment overtravel of the piston relative to the heat-sensitive body, whereas, when the mechanism is in the disengaged configuration, the resilient compression member is designed to keep the thread of the nut and the thread of the cartridge body axially in abutment.

The nut is connected in rotation about the axis to the first annular end part of the control member.

The thread of the nut and the thread of the cartridge body are indexed about the axis so as only to begin to be screwed to one another in a single angular position of the control member relative to the cartridge body.

The slide valve is provided with a bearing surface against which the endpiece bears axially when the adjustment mechanism is in the disengaged configuration.

The cartridge body and the adjustment mechanism are connected in rotation about the axis relative to one another and are rotatable along the axis relative to one another, and the adjustment mechanism and the control member are connected to one another by a helical connection centered on the axis when the adjustment mechanism is in the usage configuration and have their connection is interrupted when the adjustment mechanism is in the disengaged configuration.

The control member is made in the form of a rod, which is centered on the axis and which includes:

a first end part which extends inside the cartridge body and which is screwed to the adjustment mechanism in the usage configuration while forming the helical link, and a second end part which extends to the outside of the cartridge body.

The adjustment mechanism includes:

a nut, which is connected in rotation about the axis to the cartridge body, while being translatable along the axis relative to the cartridge body, and which is provided with a thread which, in the usage configuration, is screwed to a thread of the control member whereas, in the disengaged configuration, the thread of the nut is disengaged from the thread of the control member, an endpiece, which is mounted on the nut so as to slide along the axis, and a resilient compression member, which is axially interposed between the nut and the endpiece, and which is designed, when the adjustment mechanism is in the usage configuration, both to keep the endpiece axially pressed against the piston so as to adjust the position of this piston along the axis relative to the cartridge body and to compress axially so as to resiliently take up a deployment overtravel of the piston relative to the heat-sensitive body, whereas, when the adjustment mechanism is in the disengaged configuration, the resilient compression member is designed to keep the thread of the nut and the thread of the control member axially in abutment.

The thread of the control member is on the first end part of the rod.

The thread of the nut and the thread of the control member are indexed about the axis so as only to begin to be screwed to one another in a single angular position of the control member relative to the cartridge body.

The slide valve is provided with a bearing surface against which the endpiece bears axially when the adjustment mechanism is in the disengaged configuration.

The thermostatic cartridge further includes a mounting ring, which is designed to assemble the thermostatic cartridge in a tap body, by locking the cartridge body against the tap body, when the ring is driven in rotation about the axis simultaneously with the driving in rotation of the control member past said first angular position.

The invention will be better understood upon reading the following description, provided solely as an example and done in reference to the drawings, in which.

Figure 4:
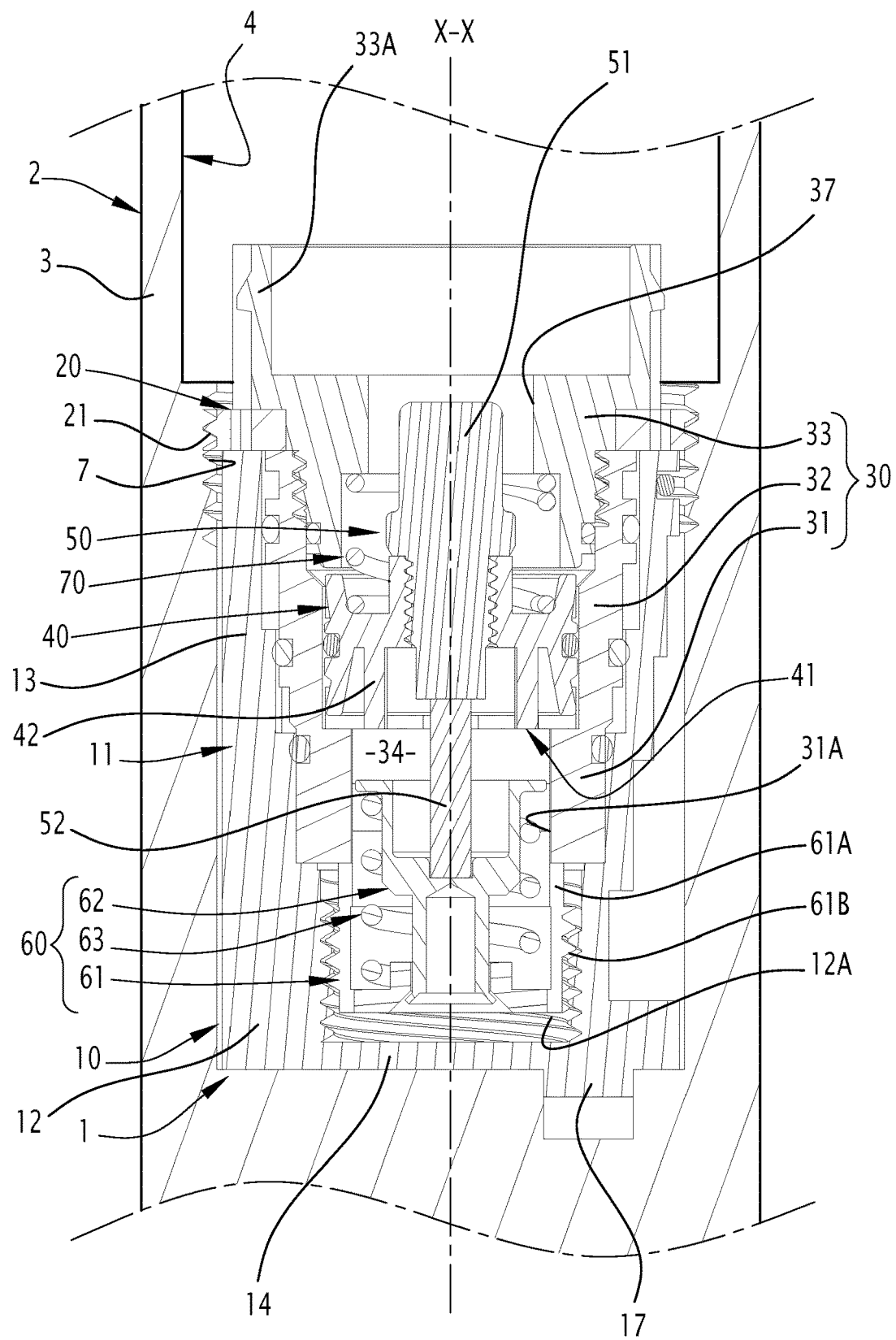
FIGS. 4 and 5 are sectional views along line IV-IV and line V-V of FIG. 3, respectively.
Figure 6:
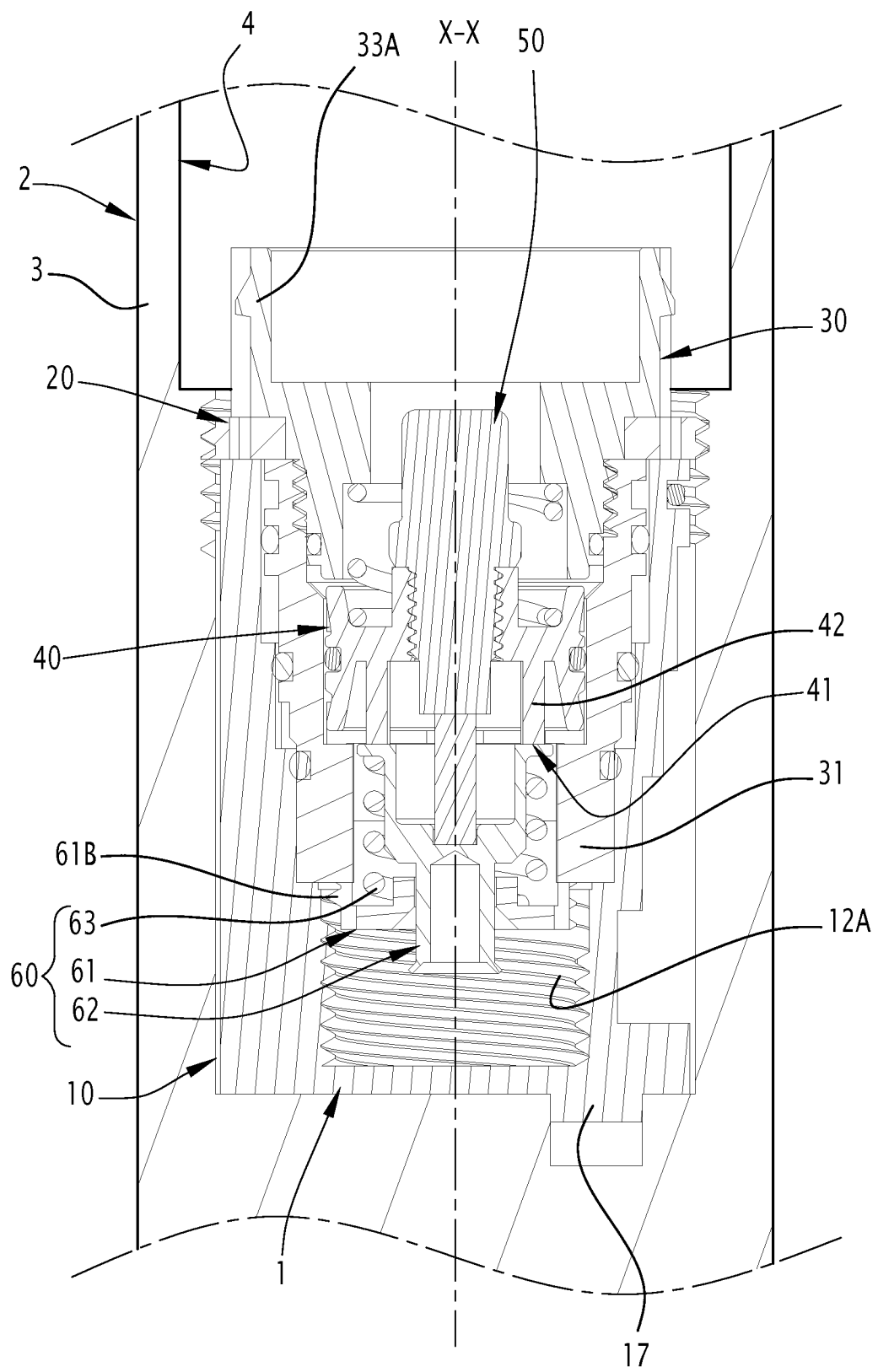
FIGS. 6 and 7 are views similar to FIGS. 4 and 5, respectively, but illustrating the cartridge during assembly inside the tap body.
Figure 10:
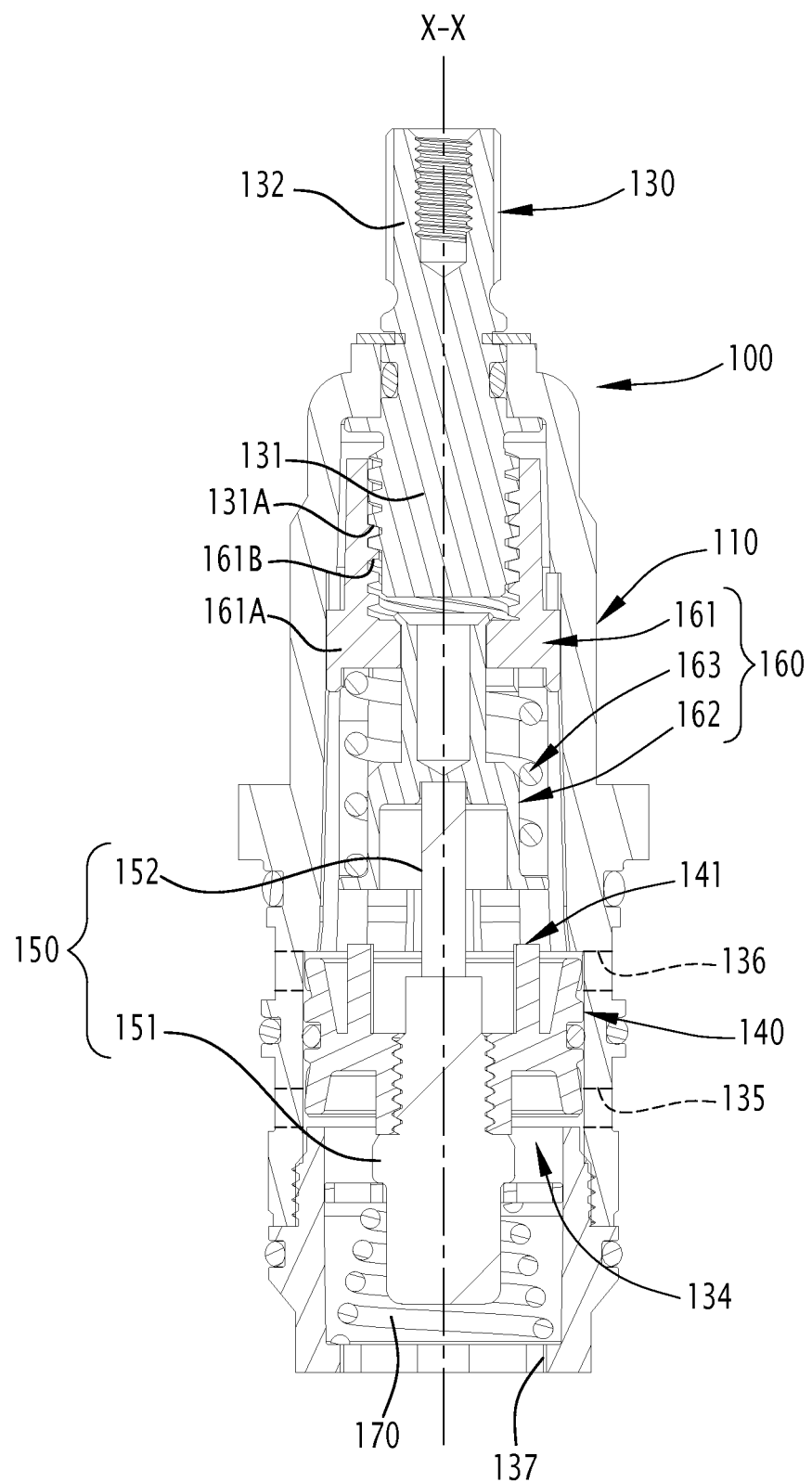
Figure 11:
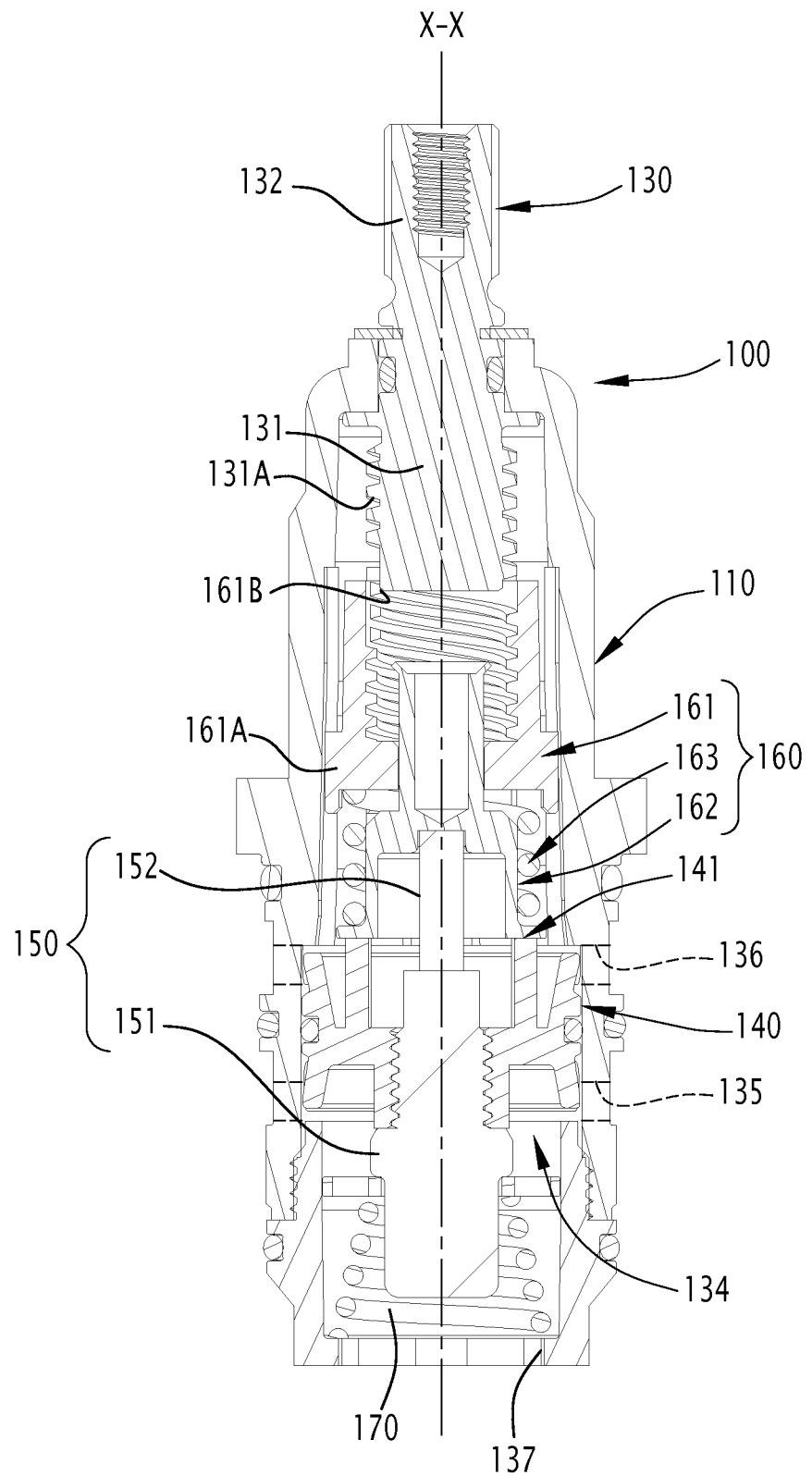
Figure 12:
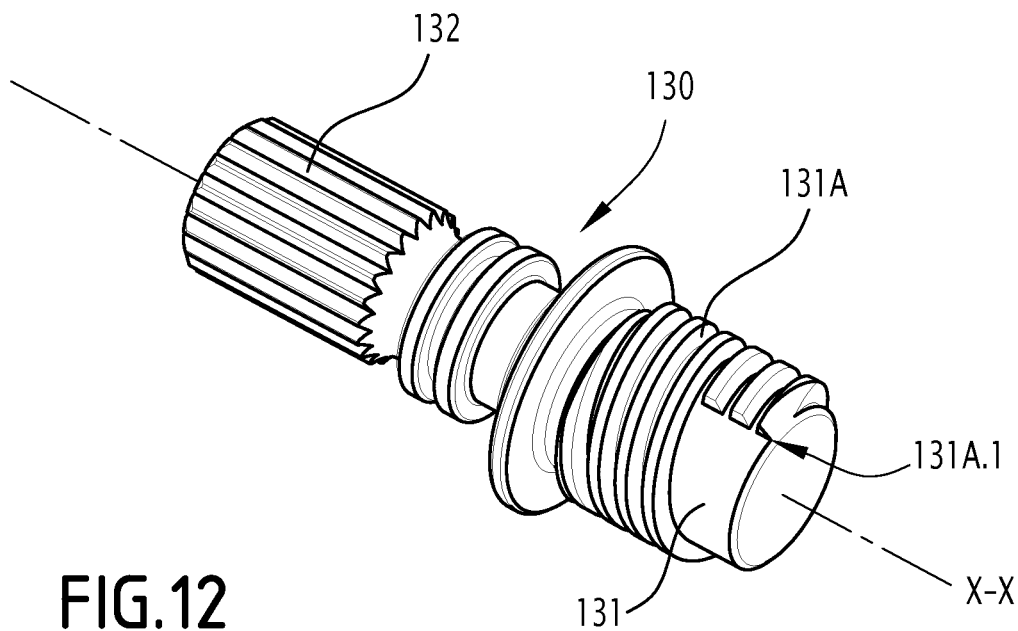
Figure 13:
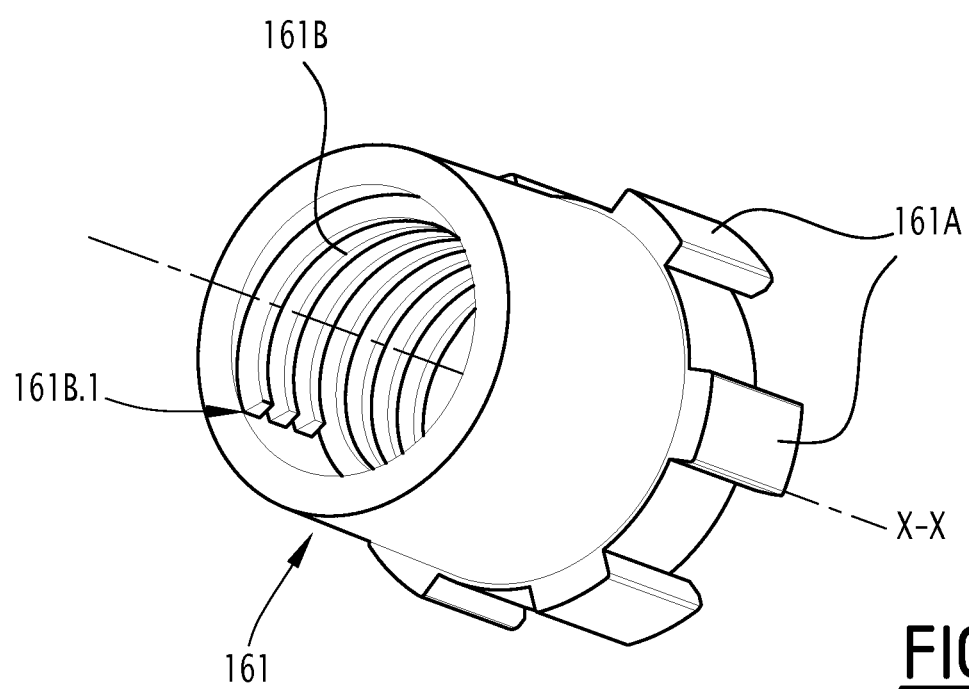

FIGS. 10 and 11 are views similar to FIGS. 4 and 6, respectively, but illustrating another embodiment of a thermostatic cartridge according to the invention; and FIGS. 12 and 13 are perspectives respectively illustrating two separate pieces, shown alone, belonging to the cartridge of FIGS. 10 and 11.

FIGS. 1 to 7 show a thermostatic cartridge 1 that is arranged about and along a central axis X-X. The cartridge 1 is designed to equip a mixer tap 2 so as to mix hot water and cold water therein.

Figure 5:
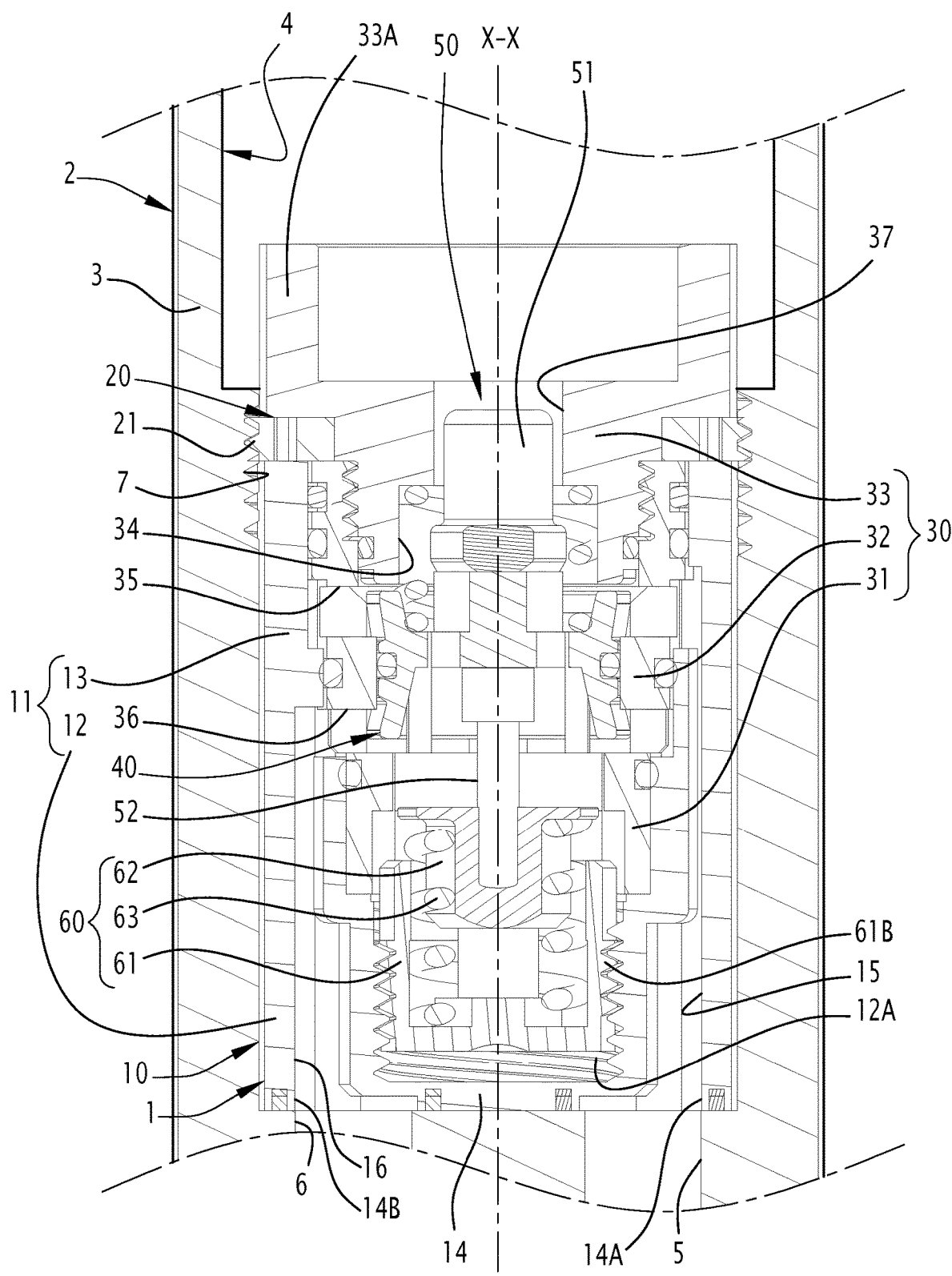

In the example embodiment considered here, the tap 2 includes a tap body 3 that delimits a cavity 4 for receiving the cartridge 1. As shown in FIG. 5, the tap body 3 is provided with a hot water inlet 5 and a cold water inlet 6, which open in the bottom of the cavity 4. The specificities of the tap 2 are not limiting with respect to the invention.

For convenience, the remainder of the description of the cartridge 1 is oriented relative to the axis X-X, considering that the terms "bottom", "lower" and the like are used to designate elements of the cartridge that face toward the bottom of the cavity 4 when the cartridge is received in this cavity, while the terms "top", "upper" and the like are used to designate elements of the cartridge that face axially in the opposite direction. Thus, in FIGS. 4 to 7, the upper elements of the cartridge 1 face toward the top part of the figures. In practice, it will be understood that this orientation defined here for convenience is not limiting with respect to the invention: in particular, when the cartridge 1 is received in the cavity 4 of the tap body 3, the axis X-X of this cartridge cannot extend vertically and/or the top part of the cartridge cannot face upward, along the actual spatial orientation of the tap body 3.

Figure 1:
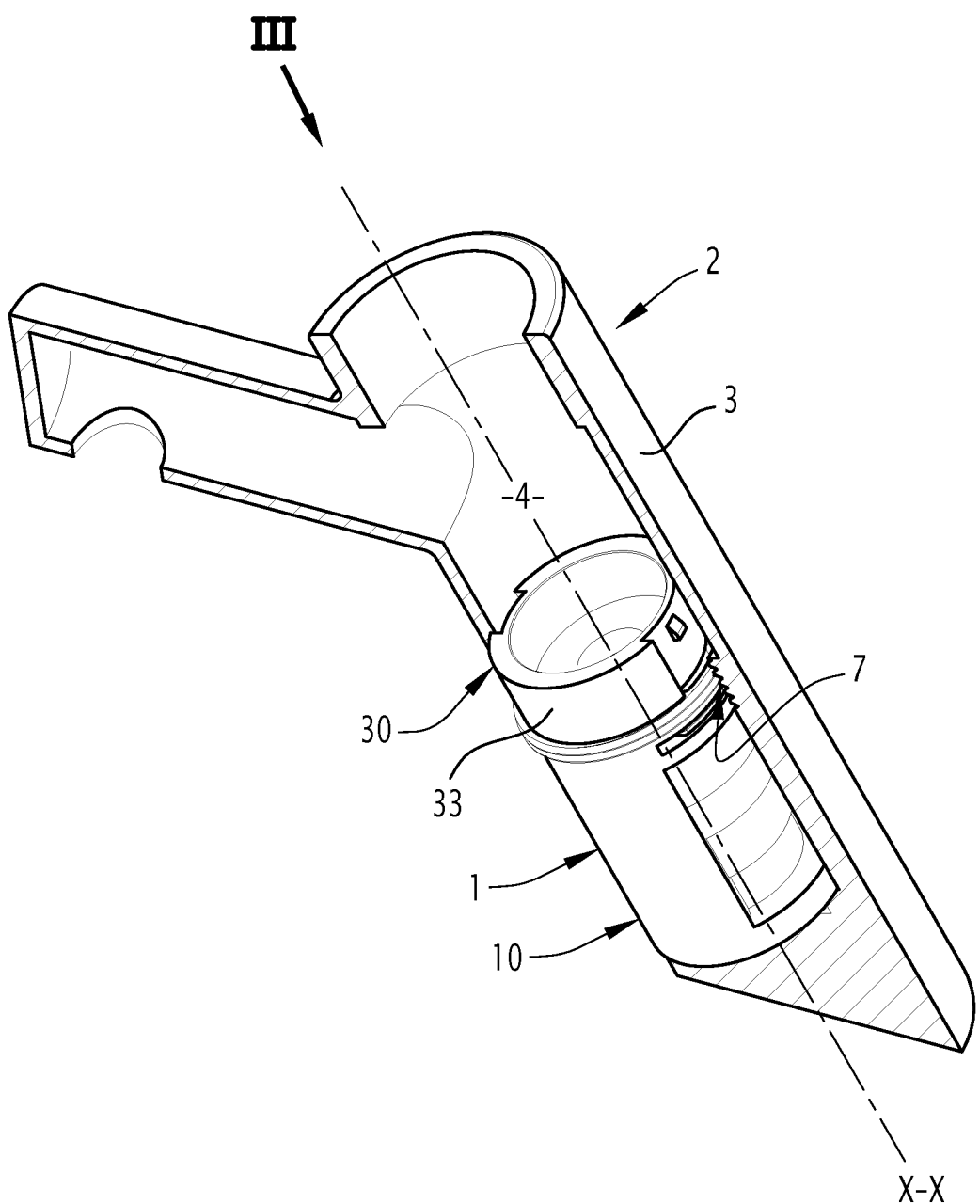
FIG. 1 is a perspective view of a mixer tap, equipped with a cartridge according to the invention, a body of the tap being cut longitudinally.
Figure 2:
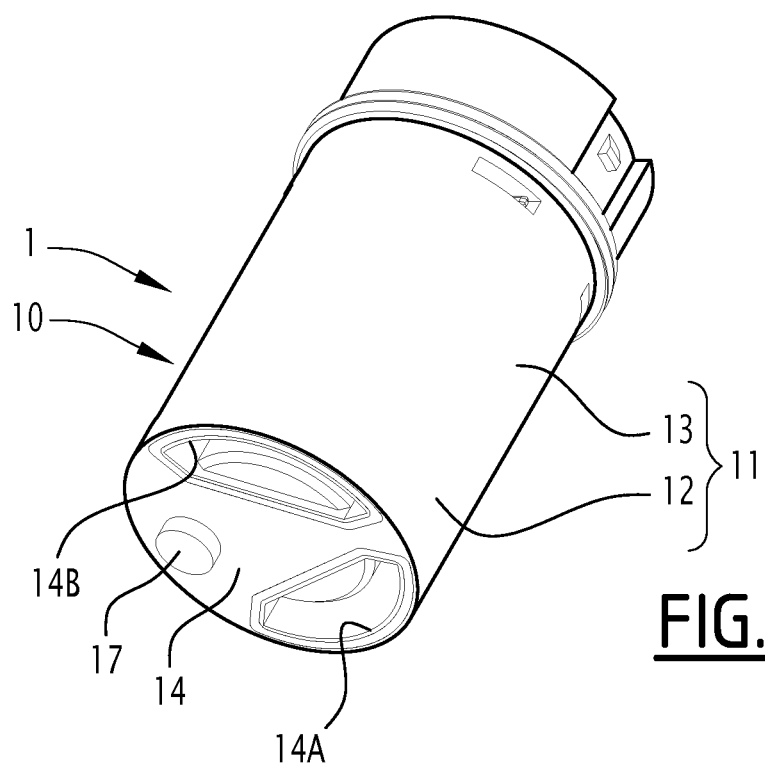
FIG. 2 is a perspective view of the cartridge of FIG. 1, shown alone.
Figure 9:
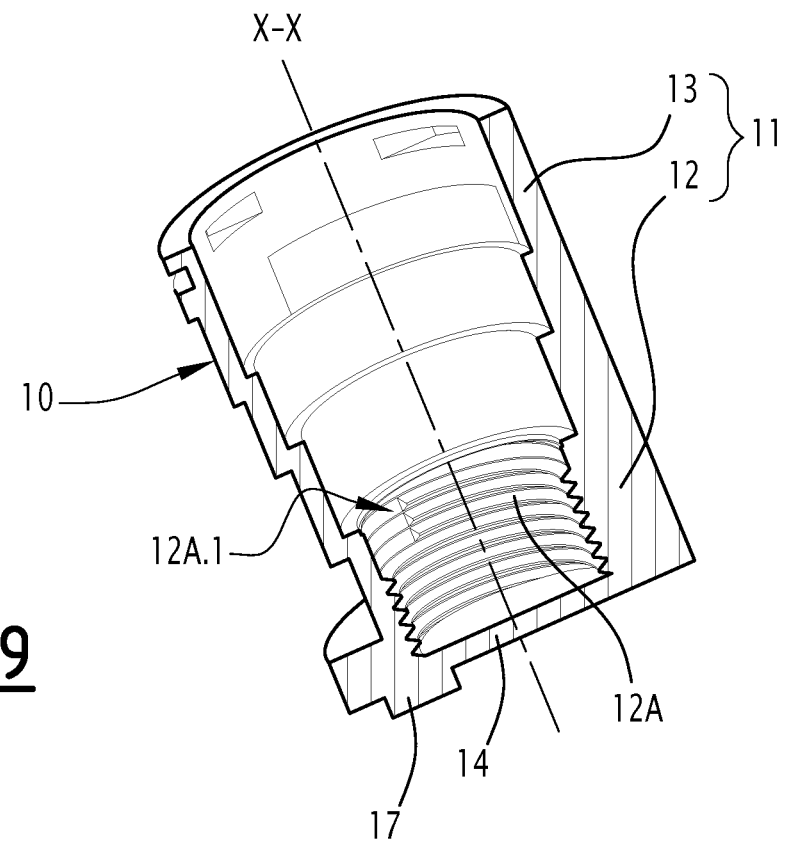
FIG. 9 is a perspective view of a longitudinal section of a cartridge body, belonging to the cartridge of the preceding figures.

The cartridge 1 includes a cartridge body 10 that, in addition to being visible in FIGS. 1 to 7 while assembled to the other components of the cartridge 1, is shown alone in FIG. 9. In the example embodiment considered here, this cartridge body 10 includes a tubular wall 11, which is centered on the axis X-X and which includes axially opposite end parts, respectively lower 12 and upper 13. As shown in FIGS. 4, 5 and 9, the tubular wall 11 inwardly delimits an elongated inner volume, which, at the upper end of the upper end part 13, is open along the axis X-X to the outside of the cartridge body 10, but which, at the lower end of the lower end part 12, is axially closed by a transverse wall 14 of the cartridge body 10, which extends transversely to the axis X-X. As shown in FIGS. 2 and 5, the transverse wall 14 delimits two peripheral axial openings 14A and 14B, which extend upward in the thickness of the tubular wall 11 in the form of two respective channels 15 and 16. As shown in FIGS. 5 and 9, these channels 15 and 16 open, at their upper end, into the inner volume of the tubular wall 11, at the upper end part 13 of this tubular wall 11. In the assembled state of the cartridge 1 in the tap body 3, the hot water inlet 5 opens into the opening 14A so as to supply the channel 15 with hot water and the cold water inlet 6 opens into the opening 14B so as to supply the channel 16 with cold water.

As shown in FIGS. 1, 2, 4 and 5, the cartridge 1 also includes a mounting ring 20 making it possible to assemble the cartridge to the tap body 3. This mounting ring 20 is designed to lock, in particular to clamp, the cartridge body 10 against the tap body 3 and thus to fixedly immobilize the cartridge body 10 inside the cavity 4. The mounting ring 20 here is provided to this end with an outer thread 21 that is able to be screwed in an inner tapping 7 of the tap body 3 when the mounting ring 20 is driven in rotation about the axis X-X. In the example embodiment considered in the figures, the mounting ring 20 is arranged at the upper end of the upper end part 13 of the tubular wall 11 of the cartridge body 10 so as, during the screwing of the outer thread 21 in the inner tapping 7, to press the cartridge body 10 axially downward against the bottom of the cavity 4, which makes it possible to improve, by taking up the axial play, the sealing of the junction between the hot water inlet 5 and the channel 15 and of the junction between the cold water inlet 6 and the channel 16.

As shown in FIGS. 4 and 5, the cartridge 1 further includes a casing 30, which has a tubular shape centered on the axis X-X. This casing 30 thus inwardly delimits an elongated inner volume, centered on the axis X-X. This casing 30 includes three successive annular parts along the axis X-X, namely a lower end annular part 31, an intermediate annular part 32 and an upper end annular part 33 that is coupled to the lower part 31 by the intermediate part 32.

In the assembled state of the components of the cartridge 1, the casing 30 is at least partially arranged inside the cartridge body 10, while being mounted on this cartridge body so as to rotate about the axis X-X. In the example embodiment considered here, the casing 30 is received coaxially inside the tubular wall 11: as visible in FIGS. 4 and 5, the lower part 31 of the casing 30 is received inside the lower end part 12 of the tubular wall 11, the intermediate part 32 of the casing 30 is received inside the upper end part 13 of the tubular wall 11, and the upper part 33 of the casing 30 extends, at least partially if not essentially, outside the tubular wall 11. The mounting ring 20 is advantageously integrated into the cartridge 1 in the assembled state of the components of the latter, while being retained around the upper part 33, axially between an outer shoulder of the latter and the upper end of the tubular wall 11 of the cartridge body 10. The lower 12 and upper 13 end parts of the tubular wall 11 have cylindrical inner surfaces, with circular bases centered on the axis X-X, which are complementary to the outer surfaces of the lower part 31 and the intermediate part 32, as well as, if applicable, the upper part 33, of the casing 30, so as to allow the free rotation of the casing 30 about the axis X-X relative to the cartridge body 10, with relative guiding. Furthermore, in the assembled state of the cartridge 1 in the tap body 3, the casing 30 is locked in translation, along the axis X-X relative to the cartridge body 10: in the example embodiment considered here, in the assembled state of the cartridge 1 in the tap body 3, the casing 30 abuts axially downward against an inner shoulder of the tubular wall 11 and abuts axially upward against the mounting ring 20.

Inwardly, the casing 30 delimits a chamber 34 inside which the hot water and the cold water, coming from the inlets 5 and 6 of the tap body 3, are provided to mix in order to form mixed water in the assembled state of the cartridge 1 in the tap body 3. This chamber 34 thus occupies all or part of the inner volume of the casing 30.

In order to allow the hot water to penetrate the chamber 34 from the outside of the casing 30, the latter delimits a hot water inlet passage 35 that passes radially all the way through the casing 30 in the intermediate part 32 of the latter, while being located axially at the upper mouth of the channel 15, as visible in FIG. 5. Likewise, in order to allow the cold water to penetrate the chamber 34 from the outside of the casing 30, the latter delimits a cold water inlet passage 36 that passes radially all the way through the casing 30 in the intermediate part 32, while being located axially at the upper mouth of the channel 16. These hot 35 and cold 36 water inlet passages are offset relative to one another along the axis X-X and for example assume the form of arcs of circumference, centered on the axis X-X.

Furthermore, in order to allow the mixed water contained in the chamber 34 to leave the casing 30, the latter delimits a mixed water outlet passage 37. In the example embodiment considered here, this outlet passage 37 is located at the upper end of the casing 30, while being centered on the axis X-X and extending axially at the upper part 33 of the casing 30, as shown in FIGS. 4 and 5. Thus, the cartridge body 10 and the casing 30 make it possible, in the state assembled to one another, for the hydraulic path through the cartridge 1 to be direct between the hot water 5 and cold water 6 inlets, opening on an axial side of the cartridge, and an outlet, from the opposite axial side of the cartridge, for the mixed water leaving the outlet passage 37: in particular, the flow through the cartridge 1 has no 180° hydraulic elbow.

It will be noted that in the example embodiment considered in the figures, the casing 30 is made up of two separate pieces, fixedly and permanently secured to one another in the assembled state of the components of the cartridge 1: an upper piece constitutes the lower part 31 of the casing 30, as well as most, if not all, of the intermediate part 32 of the latter, while an upper piece constitutes the upper part 33, as well as, if applicable, the rest of the intermediate part 32. This embodiment of the casing 30, fixedly associating these two pieces, can be of interest for the assembly of the components of the cartridge 1, but is not limiting with respect to the invention. Likewise, the nature of the stationary securing between these two pieces is not limiting: in the example considered here, these two pieces are permanently screwed to one another, but they could be glued, welded, etc.

The cartridge 1 also includes a slide valve 40, which is arranged inside the chamber 34 and which is movable therein along the axis X-X, while advantageously being guided by sliding against a complementary cylindrical inner face of the intermediate part 32 of the casing 30. The slide valve 40 is movable along the axis X-X between two opposite extreme positions, namely an extreme high position, in which its upper axial end completely closes the hot water inlet passage 35 while its lower axial end leaves the cold water inlet passage 36 wide open, and an extreme low position in which the lower axial end of the slide valve 40 completely closes the cold water inlet passage 36 while its upper axial end leaves the hot water inlet passage 35 wide open. In FIGS. 4 and 5, the slide valve 40 occupies an intermediate position between these two extreme positions. Thus, by movement along the axis X-X, the slide valve 40 closes, in inverse respective proportions, the hot water 35 and cold water 36 inlet passages, thus making it possible to regulate the temperature of the mixed water resulting from the mixing of the hot water and cold water respectively allowed into the chamber 34 through these inlet passages 35 and 36 that are more or less closed by the slide valve 40.

In order to drive the translation of the slide valve 40 along the axis X-X, the cartridge 1 includes a thermostatic element 50 that includes a heat-sensitive body 51 and a piston 52, which, in the assembled state of the components of the cartridge, are substantially centered on the axis X-X. The heat-sensitive body 51 is secured to the slide valve 40, for example by screwing, with the understanding that this securing between the slide valve 40 and the heat-sensitive body 51 is to be understood as a kinematic connection of one to the other and that the embodiment of this securing is not limiting. Furthermore, the thermostatic element 50 is designed so that its heat-sensitive body 51 and its piston 52 move relative to one another along the axis X-X, this relative movement being controlled by a temperature variation applied to the heat-sensitive body 51. To this end, the heat-sensitive body 51 for example contains a thermodilatable material, which, during its expansion, causes the piston 52 to be deployed relative to the heat-sensitive body 51 and which, during its contraction, allows the piston to retract relative to the heat-sensitive body. Other forms of heat actuation can be considered for the thermostatic element 50. In all cases, in order for the relative axial movement between the heat-sensitive body 51 and the piston 52 to be controlled by the temperature of the mixed water formed in the chamber 34, this heat-sensitive body 51 is arranged to be in contact with the mixed water, while being at least partially positioned in the chamber 34 and/or in the mixed water outlet passage 37. The piston 52 is in turn coupled to a mechanism, referenced 60 and described in detail later.

In the scenario where the mechanism 60 keeps the position of the piston 52 stationary along the axis X-X relative to the casing 30, the temperature of the mixed water at the outlet of the cartridge 1 is thermostatically regulated by the slide valve 40 and the thermostatic element 50. Indeed, in this scenario, the temperature of the mixed water results directly from the respective quantities of hot water and cold water allowed into the chamber 34 respectively via the inlet passages 35 and 36 that are more or less closed by the slide valve 40, as previously explained. If a disruption occurs in the hot water 5 and cold water 6 inlets and, for example, the temperature of the mixed water increases, the piston 52 is deployed axially relative to the heat-sensitive body 51, which causes the upward translation of the heat-sensitive body 51 and therefore of the slide valve 40: the proportion of hot water through the inlet passage 35 decreases while, conversely, the proportion of cold water through the inlet passage 36 increases, which causes a decrease in the temperature of the mixed water. An inverse reaction occurs when the temperature of the mixed water decreases, having noted that a compression spring 70 is provided to return the heat-sensitive body 51 and the piston 52 toward one another when the latter retracts, for example during a contraction of the thermodilatable material contained in the heat-sensitive body 51. In the example embodiment considered in the figures, this return spring 70 is interposed axially between the casing 30 and the slide valve 40. The corrections to the temperature of the mixed water result in a regulation equilibrium for this temperature of the mixed water, at a thermostatic regulation temperature that depends on the position, imposed by the mechanism 60, of the piston 52 along the axis X-X.

Figure 7:
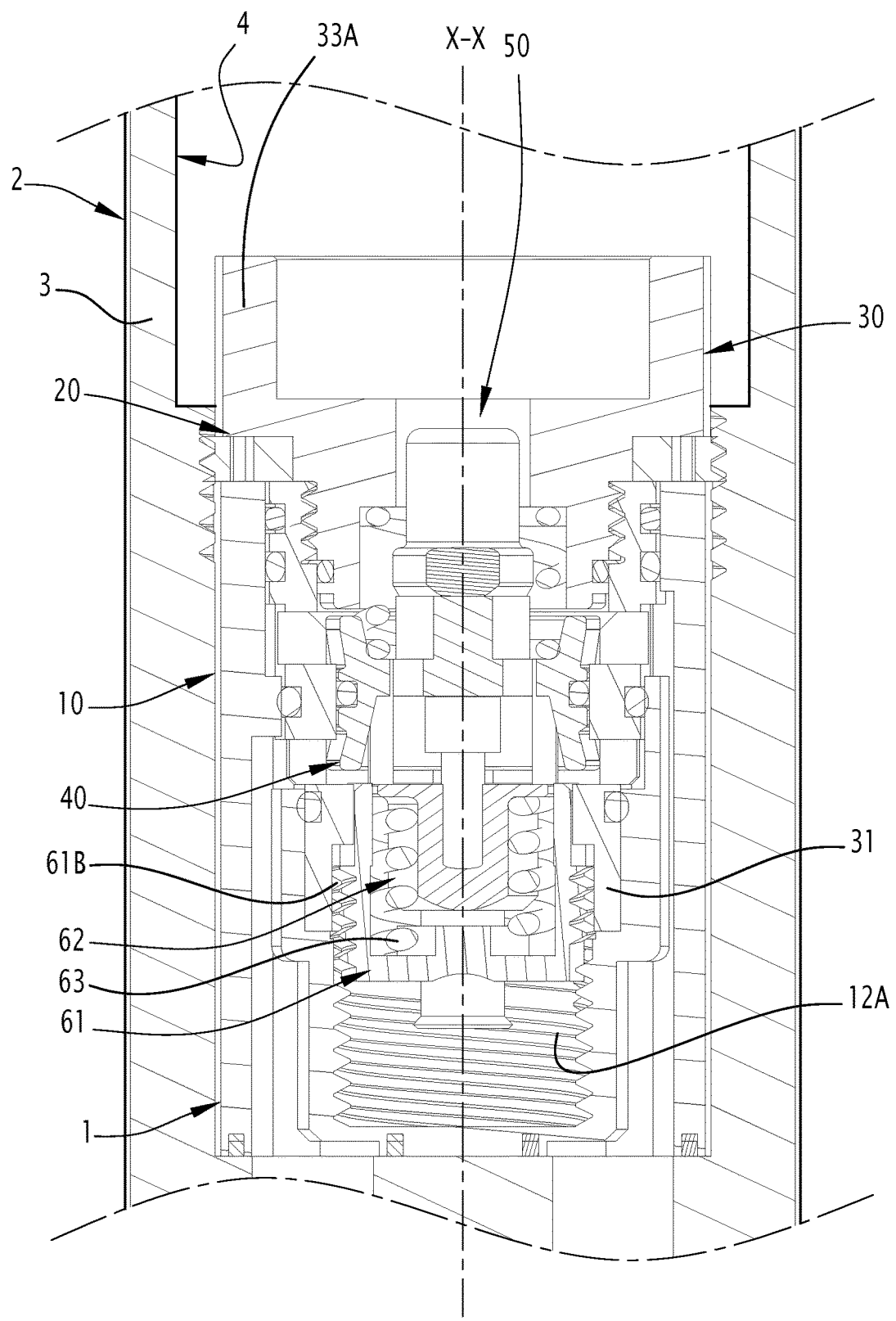

The mechanism 60 makes it possible to adjust the value of the thermostatic regulation temperature, by acting on the axial position of the piston 52 of the thermostatic element 50. It will be noted that, for reasons given later, the mechanism 60 of the cartridge 1 considered here can go between a usage configuration, which is shown in FIGS. 4 and 5 and which will be described in detail below, and a disengaged configuration, which is shown in FIGS. 6 and 7 and which will be presented afterwards.

Figure 8:
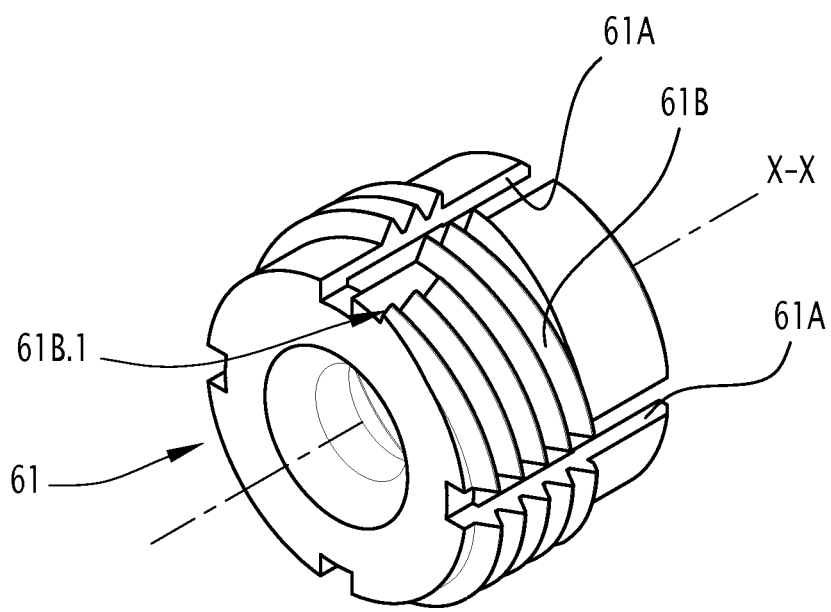
FIG. 8 is a perspective view of a nut, shown alone, belonging to the cartridge of the preceding figures.

In the example embodiment considered here, the mechanism 60 includes a nut 61, which is shown alone in FIG. 8 and which is centered on the axis X-X in the assembled configuration of the components of the cartridge 1. The mechanism 60 also includes an endpiece 62, which is centered on the axis X-X, which couples the piston 52 of the thermostatic element 50 to the rest of the mechanism 60 and which is shown on the nut 61 freely sliding along the axis X-X, the embodiment of this sliding not being limiting: here, the endpiece 62 is mounted sliding in a central bore complementary to the nut 61, as shown in FIG. 4. Furthermore, the mechanism 60 includes a compression spring 63, which is centered on the axis X-X and which is axially interposed between the nut 61 and the endpiece 62: the spring 63 tends to keep the nut 61 and the endpiece 62 axially separated from one another, having noted that the spring 63 is significantly stiffer or more powerful than the return spring 70. In practice, to prevent the endpiece 62 from disengaging with respect to the nut 61 under the effect of the spring 63, the mechanism 60 incorporates a translational retaining means, the embodiment of which is not limiting and which, in the example embodiment considered here, is provided in the form of a fold, toward the outside, of the lower end of the endpiece 62 that is provided to interfere axially with the nut in the central bore of the latter, as shown in FIG. 4.

With respect to the casing 30, the nut 61 is both locked in rotation about the axis X-X and translatable along this axis. To this end, in the example embodiment considered here, the nut 61 is provided with grooves 61A, which each extend lengthwise parallel to the axis X-X and which are distributed around this axis over the periphery of the nut 61, as shown in FIG. 8: in the assembled state of the components of the cartridge 1, each of these grooves 61A receives a complementary rib 31A supported inwardly by the lower part 31 of the casing 30, as shown in FIGS. 4 and 5. The cooperation between the grooves 61A and the ribs 31A connects the casing 30 and the nut 61 to one another in rotation about the axis X-X while ensuring, and advantageously guiding, the relative mobility of the latter in translation along the axis X-X. Of course, embodiments other than the grooves 61A and ribs 31A can be considered, in particular to form a slide connection, centered on the axis X-X, between the nut 61 and the lower part 31 of the casing 30.

With respect to the cartridge body 10, the nut 61 is, in the usage configuration of the mechanism 60, connected according to a helical connection centered on the axis X-X. To this end, in the example embodiment considered here, the nut 61 bears, on its outer face, a thread 61B that is centered on the axis X-X, as visible in FIG. 8, while the lower end part 12 of the tubular wall 11 of the cartridge body 10 is provided, inwardly, with a thread 12A that is centered on the axis X-X, as shown in FIG. 9. It will be noted that in the present document, the term "thread" is used to designate both an outwardly protruding helical shape, such as the thread 61B, and a tapping, such as the thread 12A; likewise, the term "nut" is used to designate a pierced assembly piece, provided with such a thread, such as the nut 61. The threads 12A and 61B are complementary, and their screwing to one another forms the helical connection, centered on the axis X-X, between the lower part 12 of the tubular wall 11 of the cartridge body 10 and the nut 61 of the mechanism 60 in the usage configuration. In order to limit the radial space requirement of the nut 61, the grooves 61A of the latter advantageously pass through the tubular wall of the nut, locally interrupting the thread 61B.

In light of the connections, described in detail above, between the cartridge body 10, the casing 30 and the nut 61 of the mechanism 60 in the usage configuration, it will be understood that setting the casing 30 in rotation about the axis X-X relative to the cartridge body 10 causes both the screwing or the unscrewing, depending on the rotational driving direction of the casing 30, of the nut 61 in the cartridge body 10 and the upward or downward translation, depending on the rotational driving direction of the casing 30, of the nut 61 with respect to the casing 30. Furthermore, the translational driving of the nut 61 is transmitted by the spring 63 to the endpiece 62, the latter acting in a corresponding manner on the piston 52 of the thermostatic element 50, thus setting the position of this piston along the axis X-X relative to the casing 30, due to the fact that when the mechanism 60 is in the usage configuration, the endpiece 62 is kept axially pressed against the piston 52 under the effect of the spring 63. Thus, when the casing 30 is driven in rotation about the axis X-X relative to the cartridge body 10, the mechanism 60 in the usage configuration is actuated to move relative to the cartridge body 10 so as to modify the position of the piston 52 along the axis X-X. Advantageously, in the example embodiment considered here, all of the components of the cartridge 1, aside from the cartridge body 10, can thus be driven in rotation about the axis X-X jointly with the casing 30, thus preventing or limiting the internal friction from relative movement between these components. In all cases, it will be understood that the casing 30 forms a control member making it possible to control the actuation of the mechanism 60.

It will be noted that, in the usage configuration of the mechanism 30, the transmission of forces by the spring 63 between the nut 61 and the endpiece 62 is substantially rigid due to the significant stiffness of this spring, having noted, however, that this spring 63 allows axial compression in order to resiliently take up a deployment overtravel of the piston 52 relative to the heat-sensitive body 51 during strong heating of the thermostatic element 50, for example following a sharp drop or a cutoff of the cold water supply.

In the assembled state of the cartridge 1 in the tap body 3, the casing 30 must be able to be driven in rotation about the axis X-X by the user from the outside of the cartridge body 10. To this end, the upper part 33 of the casing 30 is used, due to the fact that this upper part 33 extends at least partially outside the cartridge body 10: a system for driving in rotation about the axis X-X, which is intended to be manipulated manually by the user and not shown in the figures, can be arranged in the tap body 3, inside the cavity 4 thereof, above the thermostatic cartridge 1, to be coupled to the upper part 33 of the casing 30, for example by shape matching. This system for driving in rotation, which does not belong to the thermostatic cartridge 1, is not limiting with respect to the invention. This being the case, it will be understood that according to the specificities of this driving system, if applicable in connection with the specific design of the tap body 3, the geometry, that is to say the shape and/or the dimensions of the upper part 33 of the casing 30, can be developed accordingly. In particular, in the example embodiment considered here, the upper part 33 of the casing 30 forms, at its upper end, a crown gear 33A that is provided to be coupled with the aforementioned rotational driving system by shape matching: this crown gear 33A is centered on the axis X-X and extends entirely outside the cartridge body 10, above the upper end part 13 of the latter.

In all cases, in the assembled state of the cartridge 1 in the tap body 3, the driving of the casing 30 in rotation about the axis X-X should only be provided over a limited angular travel, namely an angular travel between first and second angular positions that respectively correspond to an extreme low value and an extreme high value for the thermostatic regulation temperature. To this end, in a manner known in itself and not described in detail here, two mechanical stops are integrated into the tap body 3 so as to limit the driving travel of the aforementioned rotational driving system: when the rotational driving system is placed against one of these stops, this rotational driving system places the casing 30 in one of the first and second angular positions that are respectively associated with the extreme low and high values of the thermostatic regulation temperature, whereas when the rotational driving system is placed against the other stop, this rotational driving system places the casing 30 in the other of the first and second aforementioned angular positions.

Furthermore, also in a manner known in itself and which is not described in detail here, the final assembly of the components of the cartridge 1 is done with temperature calibration of this cartridge. In order to perform the calibration of a thermostatic cartridge, it is known to have the cartridge supplied with hot water and cold water under normal conditions, then to adjust the position of the control member making it possible to actuate the adjustment mechanism for the thermostatic regulation temperature, in order for the mixed water leaving the cartridge to have a predetermined temperature, for example equal to 38° C.; the relative angular position between the control member and the cartridge body is then identified, in order to be able to find it when the cartridge will next be installed in a tap body and coupled to a manual driving system of the control member. To calibrate the cartridge 1, it is supplied under normal conditions and the angular position, about the axis X-X, of the casing 30 is identified when the mixed water leaving the cartridge 1 has the aforementioned predetermined temperature. This identification is done using respective markings on the cartridge body 10 and on the casing 30, in particular on the upper part 33 of the latter so that the corresponding marking is easily observable from the outside of the cartridge body. Advantageously, due to the helical connection between the cartridge body 10 and the nut 61 of the mechanism 60 in the usage configuration, the aforementioned marking may not be provided on the cartridge body 10 once, in the assembled state of the cartridge 1 in the tap body 3, the angular positioning of the cartridge body in the cavity 4 is predetermined in a stationary manner, with, for example, an angular positioning pin of the cartridge body in the tap body, such as a positioning pin 17 borne projecting axially downward by the transverse wall 14 in the example embodiment considered here. Of course, in this case, the tap body 3 must bear a marking that will make it possible to identify the calibration of the thermostatic cartridge 1.

As mentioned above, the mechanism 60 can go from its usage configuration, described thus far, to the disengaged configuration shown in FIGS. 6 and 7. In this disengaged configuration, the connection between the mechanism 60 and the cartridge body 10 is interrupted: thus, in the example embodiment considered here, the screw thread 61A of the nut 61 is disengaged from the thread 12A of the cartridge body 10, while being kept axially abutting against the latter under the action of the spring 63.

Figure 3:
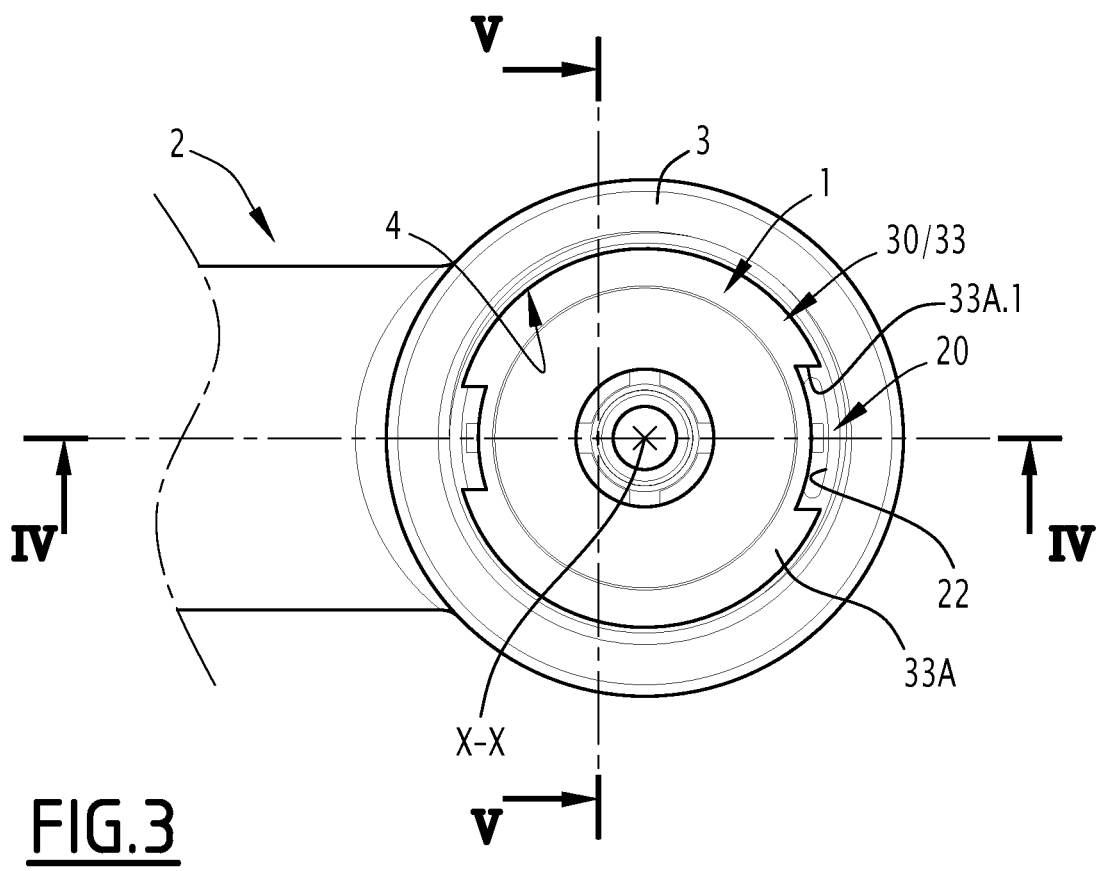
FIG. 3 is an elevation view along arrow III of FIG. 1.

The passage of the mechanism 60 between the usage configuration and the disengaged configuration is controlled by the driving of the casing 30 in rotation about the axis X-X. As explained hereinafter, the passage of the mechanism 60 between these two configurations can advantageously take place during the assembly of the cartridge 1 in the tap body 2, facilitating this assembly. Indeed, after having introduced and positioned the cartridge 1, in the assembled state of the components of the cartridge 1, in the cavity 4 of the tap body 3, assembling the cartridge to the tap body 3 requires, as explained above, screwing the mounting ring 20 in the tap body 3, at the tapping 7 of the latter. However, in light of the presence of the crown gear 33A at the upper end of the casing 30, driving the mounting ring 20 in rotation for screwing thereof may cause the casing 30 to be set in rotation about the axis X-X. When the outer diameter of the crown gear 33A is substantially equal to that of the mounting ring 20, the simultaneous driving of this mounting ring 20 and of the casing 30 is even inevitable once the mounting ring 20 is set in rotation through the crown gear 33A: thus, in the example embodiment considered here and as shown in FIG. 3, a peripheral indentation 33A.1 of the crown gear 33A allows axial access to a relief 22 of the mounting ring 20, so as to be able to drive the latter in rotation on itself about the axis X-X owing to a tool introduced axially through the indentation 33A.1 in order to cooperate with the relief 22. In practice, before beginning to screw the mounting ring 20, the cartridge body 10 must be locked angularly about the axis X-X relative to the tap body 3 in order to prevent the cartridge 1 from rotating on itself in the cavity 4: this locking is advantageously ensured by the cooperation of the positioning pin 17 with a complementary recess, arranged in the bottom of the cavity 4 and in which this pin is received, as shown in FIGS. 4 and 6. Furthermore, the screwing of the mounting ring 20 in the tapping 7 of the tap body 3 requires driving this ring in rotation over several revolutions: the casing 30 is driven in rotation on itself in a corresponding manner, that is to say over several revolutions. It will be understood that the casing 30 is thus driven in rotation about the axis X-X over more than the limited angular travel, mentioned above and defined between the first and second angular positions of the casing 30 respectively associated with the extreme low and high values of the thermostatic regulation temperature. More specifically, the screwing of the mounting ring 20 drives the casing 30 in rotation past its first angular position, that is to say that corresponding to the extreme low position of the thermostatic regulation temperature, and in the direction opposite that oriented toward its second angular position, that is to say that corresponding to the extreme high position of this thermostatic regulation temperature.

This driving in rotation of the casing 30 causes the mechanism 60 to go from its usage configuration of FIGS. 4 and 5 to its disengaged configuration of FIGS. 6 and 7, subject to the complete unscrewing of the nut 61 with respect to the cartridge body 10 and the translational retraction of this nut to the inside of the lower part 31 of the casing 30. The upward driving in translation of the nut 61 tends to drive the endpiece 62, pressed axially upward against the piston 52, in a corresponding manner: the thermostatic element 50 then tends to compress axially, by forced retraction of its piston 52 to the inside of the heat-sensitive body 51, but with an axial compression travel that can be less than the axial retraction travel of the nut 61 in the lower part 31 of the casing 30, then leading to an axial compression of the spring 63, as shown by comparing FIGS. 4 and 5 with FIGS. 6 and 7. In this way, the mechanism 60 thus disengaged and the thermostatic element 50 are neither locked nor damaged, despite setting the casing 30 in rotation past the aforementioned first angular position, and over a potentially significant travel, for example of several revolutions. As explained in detail here, this possibility of driving is used to facilitate the mounting, by clamping, of the cartridge 1 in the tap body 4, without increasing the axial space requirement of the adjustment mechanism. It will be noted that, in the case where the clamping of the cartridge is independent of its control member, this possibility of driving the control member makes it possible to prevent damage to the cartridge connected to the untimely passing of the aforementioned first angular position or related to the application by the user of an excessive stop torque to command the cartridge to fully cold.

Advantageously, to further protect the thermostatic element 50 from overstresses applied by the endpiece 62 under the effect of the compressed spring 63, the slide valve 40 is advantageously provided with a bearing surface 41 against which the endpiece 62 axially bears directly when the mechanism 60 is in the disengaged configuration, as shown in FIGS. 6 and 7: once the nut 62 is pressed axially upward against this bearing surface 41 of the slide valve 40, the stresses applied upward by the endpiece 62 are no longer transmitted to the thermostatic element 50, but are absorbed directly by the slide valve 40, which, if applicable, can bear axially against the casing 30, without risk of damage. In the example embodiment considered here, the bearing surface 41 is delimited at the free end of a spacer 42, permanently secured to the slide valve 40 while extending downward from a central region of this slide valve. Other embodiments of the bearing surface 41 can be considered.

Once the mechanism 60 is in the disengaged configuration, it is possible to continue to drive the casing 30 in rotation over as many revolutions as necessary to arrive at the complete screwing of the mounting ring 20 in the tap body 3. The mechanism 60 then stays in the disengaged configuration, with the threads 12A and 61B that remain disengaged from one another, while being kept axially abutting against one another: upon each new revolution of the casing 30, the thread 61B of the nut 61 jumps with respect to the thread 12A of the cartridge body 10.

Once the mounting ring 20 is completely screwed in the tap body 3 and the cartridge body 10 is thus fixedly assembled in the cavity 4, the mechanism 60 must be returned from its disengaged configuration to its usage configuration. To do this, the casing 30 is driven in rotation about the axis X-X in the direction opposite that implemented during the clamping of the mounting ring 20, until it returns between the aforementioned first and second angular positions. In practice, the driving of the casing 30 is done at its upper part 33, emerging outside the cartridge body 10. This setting in rotation of the casing 30 leads to re-screwing the thread 61B of the nut 61 with the thread 12A of the cartridge body 10, the re-engagement of the threads being made easier by the action of the spring 63 tending to separate the nut 61 and the endpiece 62 from one another axially.

Advantageously, the threads 12A and 61B only begin to be screwed to one another in a single angular position of the casing 30. To this end, these threads 12A and 61B are indexed about the axis X-X, as clearly visible in FIGS. 8 and 9, in which the respective indexes of the threads 12A and 61B are referenced 12A.1 and 61B.1. In the case where each of the threads 12A and 61B includes several screw threads, such as three screw threads in the example considered here, these screw threads of each thread all starting on a same line either parallel to the axis X-X, or wound around the axis X-X, at the corresponding index 12A.1, 61B.1. In all cases, the indexing of the threads 12A and 61B makes it possible to index, around the axis X-X, the helical connection between the cartridge body 10 and the mechanism 60, therefore between the cartridge body 10 and the casing 30 due to the rotational connection between the nut 61 and the casing 30: by driving the casing 30 in rotation from beyond the aforementioned first angular position to this first angular position, the mechanism 60 returns to the usage configuration and, owing to the indexing of the threads 12A and 61B, the casing 30 can next be driven into a predetermined angular position, identified relative to the tap body 3 by the calibration marking mentioned above, advantageously borne by the upper part 33 of the casing 30.

FIGS. 10 and 11 shows a thermostatic cartridge 100 as an alternative embodiment to the cartridge 1 described thus far.

The cartridge 100 includes a slide valve 140, a thermostatic element 150, a mechanism 160 and a return spring 170, which are functionally similar, respectively, to the slide valve 40, the thermostatic element 50, the mechanism 60 and the return spring 70 of the cartridge 1.

The cartridge 100 differs from the cartridge 1 by the embodiment of its control member 130 making it possible to control the movement of the mechanism 160: indeed, in the cartridge 100, the control member 130 is not formed by a tubular casing like the casing 30 described above, but is made in the form of a rod 130 centered on the axis X-X. Furthermore, since the cartridge 100 is devoid of a casing similar to the casing 30 of the cartridge 1, a cartridge body 110 directly delimits a chamber 134, a hot water inlet passage 135, a cold water inlet passage 136 and mixed water outlet passage 137, which are respectively functionally similar to the chamber 34, the hot water inlet passage 35, the cold water inlet passage 36 and the mixed water outlet passage 37 of the cartridge 1. In particular, the slide valve 140 is arranged inside this chamber 134, while being movable along the axis X-X relative to the cartridge body 110 so as to close, in respective inverse proportions, the hot water inlet passage 135 and the cold water inlet passage 136.

In the assembled state of the components of the cartridge 100, the rod 130 forming the control member for this cartridge extends both inside and outside the cartridge body 110: more specifically, the rod 130 includes a lower end part, which extends inside the cartridge body 110, and an upper end part 132, which extends outside the cartridge body. In the assembled state of the components of the cartridge 1, the rod 130 is fixedly connected in translation along the axis X-X to the cartridge body 110.

As previously indicated, the mechanism 160 of the cartridge 100 is functionally similar to the mechanism 60 of the cartridge 1: thus, the mechanism 160 makes it possible to adjust the thermostatic element 150 to a thermostatic regulation temperature, the value of this thermostatic regulation temperature depending on the position of the piston of the thermostatic element 150 along the axis X-X relative to the cartridge body 110.

Furthermore, in a manner that is functionally similar to the mechanism 60, the mechanism 160 is designed to go between a usage configuration, shown in FIG. 10, and a disengaged configuration, shown in FIG. 11, when the rod 130 is driven in rotation about the axis X-X past the angular position corresponding to the extreme low value of the thermostatic regulation temperature. The technical effects which are respectively associated with the usage configuration and with the disengaged configuration of the mechanism 160 are similar to those which are respectively associated with the usage configuration and with the disengaged configuration of the mechanism 60, but the structural specificities of these configurations are different for the mechanism 160.

More specifically, the mechanism 160 includes a nut 161, an endpiece 162 and a compression spring 163, which are centered on the axis X-X. The nut 161, which is shown alone in FIG. 13, is connected in rotation about the axis X-X to the cartridge body 110, while being movable in translation along this axis relative to the cartridge body: to this end, as shown in FIGS. 10, 11 and 13, the nut 161 is provided with outer ribs 161A that are mounted sliding along the axis X-X in complementary inner ribs 110A of the cartridge body 110. Furthermore, the nut 161 is provided with an inner thread 161B which, in the usage configuration, is screwed to a complementary outer thread 131A of the lower part 131 of the rod 130, and which, in the disengaged configuration, is disengaged from this thread 131A. The endpiece 162 is mounted on the nut 161 so as to slide along the axis, with the spring 163 inserted axially between them: as shown in FIGS. 10 and 11, the corresponding structure of the endpiece 162 and of the spring 163 is similar to that outlined above for the endpiece 62 and the spring 63.

When the mechanism 160 is in the usage configuration, the spring 163 keeps the endpiece 162 axially pressed against the piston of the thermostatic element 150 so as to adjust the axial position of the latter relative to the cartridge body 110, and this spring 163 can compress axially in order to resiliently take up a deployment overtravel of the piston relative to the heat-sensitive body of the thermostatic element 150. When the mechanism 160 is in the disengaged configuration, the spring 163 makes it possible to keep the thread 161B of the nut 161 and the thread 131A of the rod 130 axially in abutment, as shown in FIG. 11.

More generally, the mechanism 160 and the rod 130 are connected to one another by a helical connection, centered on the axis X-X and formed by the threads 131A and 161B screwed to one another, when the mechanism 160 is in the usage configuration, while the connection of the mechanism 160 and the rod 130 is interrupted when the mechanism is in the disengaged configuration.

The structural specificities of the cartridge 100 with respect to the cartridge 1 do not change the implementation of the passage between the usage and disengaged configurations for the mechanism 160: before the driving of the rod 130 in rotation about the axis X-X is limited over a travel between first and second angular positions that respectively correspond to the extreme low value and the extreme high value of the thermostatic regulation temperature, the rotation of the rod 130 past the aforementioned first angular position causes the mechanism 160 to go from its usage configuration to its disengaged configuration, as explained in detail above for the mechanism 60. Then, by rotation of the rod 130, still past the aforementioned first angular position but in the opposite direction, the mechanism 60 returns from the disengaged configuration to the usage configuration, also as described above for the mechanism 60.

Advantageously, for the same reasons as those previously developed, the thread 161B of the nut 161 and the thread 131A of the rod 130 are indexed about the axis X-X so as only to begin to be screwed to one another in a single angular position of the rod 130 relative to the cartridge body 110, the corresponding indexes respectively being referenced 161B.1 for the thread 161B of the nut 161 and 131A.1 for the thread 131A of the rod 130, as shown in FIGS. 12 and 13.

Also advantageously, the slide valve 140 is provided with a bearing surface 141, which is functionally similar to the bearing surface 41 of the slide valve 40 described above and against which the endpiece 162 bears axially when the mechanism 160 is in the disengaged configuration, as shown in FIG. 11.

The alternative embodiment constituted by the cartridge 100 relative to the cartridge 1 illustrates the various possibilities for integrating an adjustment mechanism for the thermostatic regulation temperature of the cartridge, integrating a disengagement capacity, both in the case where the cartridge is locked in a tap body by a mounting ring that can be driven simultaneously with the control member of this cartridge, like for the cartridge 1, as well as in the case where the clamping of the cartridge is independent of the control member, like potentially for the cartridge 100.

What is claimed is:

1. A thermostatic cartridge, including:
   a cartridge body, inside which are simultaneously delimited a chamber in which a hot fluid and a cold fluid mix in order to form a mixed fluid, a hot fluid inlet passage through which the hot fluid penetrates the chamber from the outside of the cartridge body, a cold fluid inlet passage through which the cold fluid penetrates the chamber from the outside of the cartridge body, and a mixed fluid outlet passage through which the mixed fluid contained in the chamber leaves the cartridge body,
   a slide valve for regulating the temperature of the mixed fluid, which is arranged inside the chamber and which is movable along an axis relative to the cartridge body so as to close, in respective inverse proportions, the hot fluid inlet passage and the cold fluid inlet passage,
   a thermostatic element which includes a heat-sensitive body, which is secured to the slide valve and is arranged to be in contact with the mixed fluid, and a piston, the heat-sensitive body and the piston moving relative to one another along the axis as a function of the temperature of the mixed fluid,
   an adjustment mechanism for adjusting a thermostatic regulation temperature, which adjustment mechanism is, in a usage configuration, mechanically connected to the cartridge body and is designed to secure the position of the piston along the axis relative to the cartridge body and to alter this position of the piston by actuating the adjustment mechanism to move relative to the cartridge body, and
   a control member, which is mounted on the cartridge body so as to rotate about the axis, while being rotationally drivable from the outside of the cartridge body, and which is mechanically connected to the adjustment mechanism in the usage configuration so as to actuate the adjustment mechanism to move when the control member is driven in rotation between first and second angular positions, which are respectively associated with an extreme low value and an extreme high value of the thermostatic regulation temperature,
   wherein the adjustment mechanism is designed, when the control member is driven in rotation about the axis past the first angular position, to go between the usage configuration and a disengaged configuration in which the connection between the adjustment mechanism and either the cartridge body or the control member is interrupted.

2. The thermostatic cartridge according to claim 1, wherein the control member and the adjustment mechanism are connected in rotation about the axis relative to one another and are translatable along the axis relative to one another, and wherein the adjustment mechanism and the cartridge body are connected to one another by a helical connection centered on the axis when the adjustment mechanism is in the usage configuration and their connection is interrupted when the adjustment mechanism is in the disengaged configuration.

3. The thermostatic cartridge according to claim 2, wherein the control member is made in the form of a tubular casing, which is centered on the axis and which includes:
   a first annular end part, which mechanically cooperates with the adjustment mechanism according to a slide connection, a second annular end part, which is axially opposite the first annular end part and which extends axially to the outside of the cartridge body, and a running part, which couples the first and second annular end parts.

4. The thermostatic cartridge according to claim 2, wherein the adjustment mechanism includes:

a nut, which is connected in rotation about the axis to the control member, while being translatable along the axis relative to the control member, and which is provided with a thread which, in the usage configuration, is screwed to a thread of the cartridge body while forming the helical connection, whereas, in the disengaged configuration, the thread of the nut is disengaged from the thread of the cartridge body, an endpiece, which is mounted on the nut so as to slide along the axis, and a resilient compression member, which is axially interposed between the nut and the endpiece and which is designed, when the adjustment mechanism is in the usage configuration, both to keep the endpiece axially pressed against the piston so as to adjust the position of the piston along the axis relative to the cartridge body and to compress axially so as to resiliently take up a deployment overtravel of the piston relative to the heat-sensitive body, whereas, when the mechanism is in the disengaged configuration, the resilient compression member is designed to keep the thread of the nut and the thread, of the cartridge body axially in abutment.

5. The thermostatic cartridge according to claim 4, wherein the control member is made in the form of a tubular casing, which is centered on the axis and which includes:

a first annular end part, which mechanically cooperates with the adjustment mechanism according to a slide connection, a second annular end part, which is axially opposite the first annular end part and which extends axially to the outside of the cartridge body, and a running part, which couples the first and second annular end parts, and wherein the nut is connected in rotation about the axis to the first annular end part of the control member.

6. The thermostatic cartridge according to claim 4, wherein the thread of the nut and the thread of the cartridge body are indexed about the axis so as only to begin to be screwed to one another in a single angular position of the control member relative to the cartridge body.

7. The thermostatic cartridge according to any one of claims 4, wherein the slide valve is provided with a bearing surface against which the endpiece bears axially when the adjustment mechanism is in the disengaged configuration.

8. The thermostatic cartridge according to claim 1, wherein the cartridge body and the adjustment mechanism are connected in rotation about the axis relative to one another and are rotatable along the axis relative to one another, and wherein the adjustment mechanism and the control member are connected to one another by a helical connection centered on the axis when the adjustment mechanism is in the usage configuration and have their connection interrupted when the adjustment mechanism is in the disengaged configuration.

9. The thermostatic cartridge according to claim 8, wherein the control member is made in the form of a rod, which is centered on the axis and which includes:

a first end part which extends inside the cartridge body and which is screwed to the adjustment mechanism in the usage configuration while forming the helical link, and a second end part which extends to the outside of the cartridge body.

10. The thermostatic cartridge according to claim 8, wherein the adjustment mechanism includes:

a nut, which is connected in rotation about the axis to the cartridge body, while being translatable along the axis relative to the cartridge body, and which is provided with a thread which, in the usage configuration, is screwed to a thread of the control member whereas, in the disengaged configuration, the thread of the nut is disengaged from the thread of the control member, an endpiece, which is mounted on the nut so as to slide along the axis, and a resilient compression member, which is axially interposed between the nut and the endpiece, and which is designed, when the adjustment mechanism is in the usage configuration, both to keep the endpiece axially pressed against the piston so as to adjust the position of this piston along the axis relative to the cartridge body and to compress axially so as to resiliently take up a deployment overtravel of the piston relative to the heat-sensitive body, whereas, when the adjustment mechanism is in the disengaged configuration, the resilient compression member is designed to keep the thread of the nut and the thread of the control member axially in abutment.

11. The thermostatic cartridge according to claim 10, wherein the control member is made in the form of a rod, which is centered on the axis and which includes:

a first end part which extends inside the cartridge body and which is screwed to the adjustment mechanism in the usage configuration while forming the helical link, and a second end part which extends to the outside of the cartridge body, and wherein the thread of the control member is on the first end part of the rod.

12. The thermostatic cartridge according to claim 10, wherein the thread of the nut and the thread of the control member are indexed about the axis so as only to begin to be screwed to one another in a single angular position of the control member relative to the cartridge body.

13. The thermostatic cartridge according to claim 10, wherein the slide valve is provided with a bearing surface against which the endpiece bears axially when the adjustment mechanism is in the disengaged configuration.

14. The thermostatic cartridge according to claim 1, wherein the thermostatic cartridge further includes a mounting ring, which is designed to assemble the thermostatic cartridge in a tap body, by locking the cartridge body against the tap body, when the ring is driven in rotation about the axis simultaneously with the driving in rotation of the control member past said first angular position.

* * * * *